Patented Feb. 10, 1931

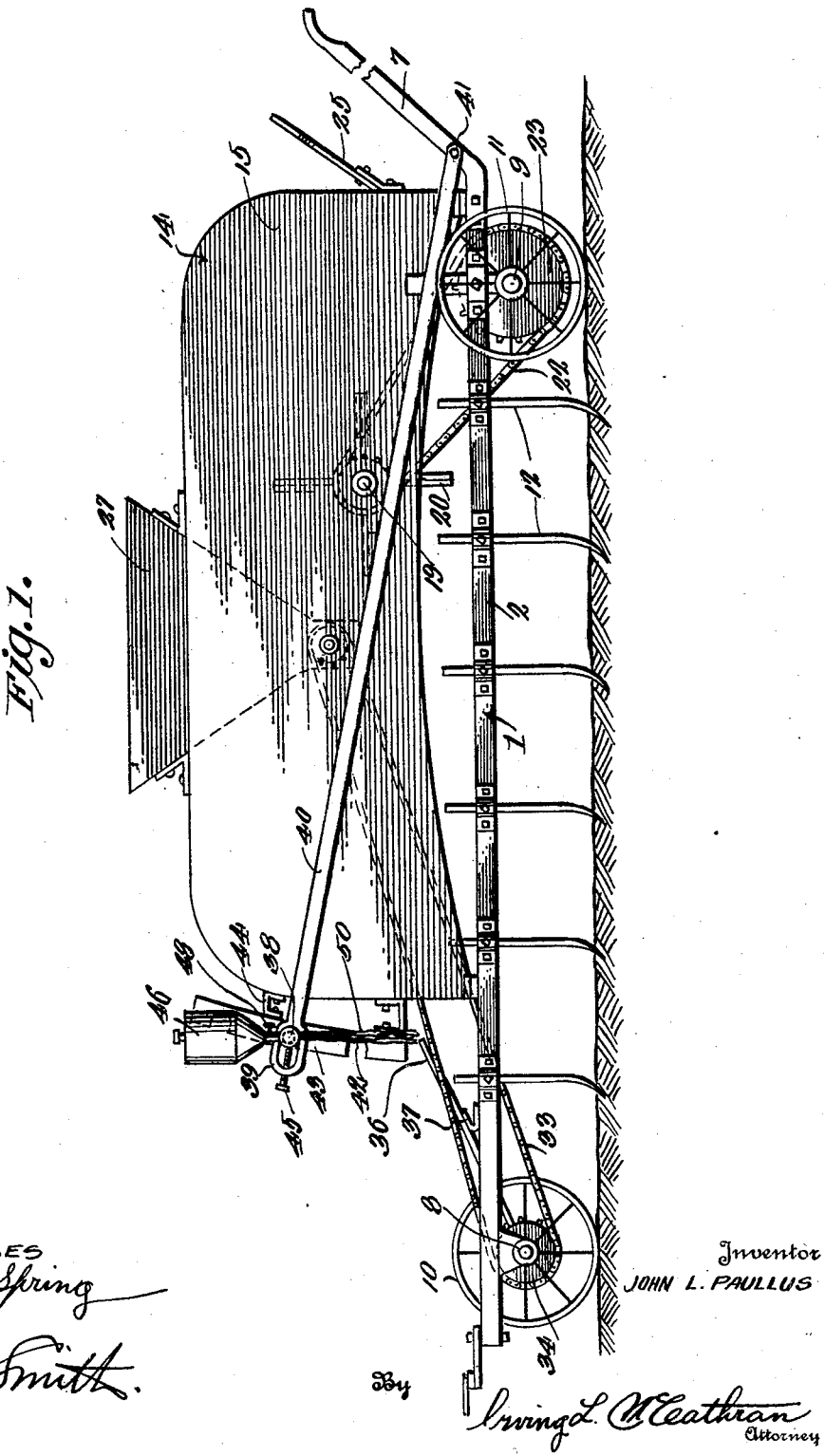

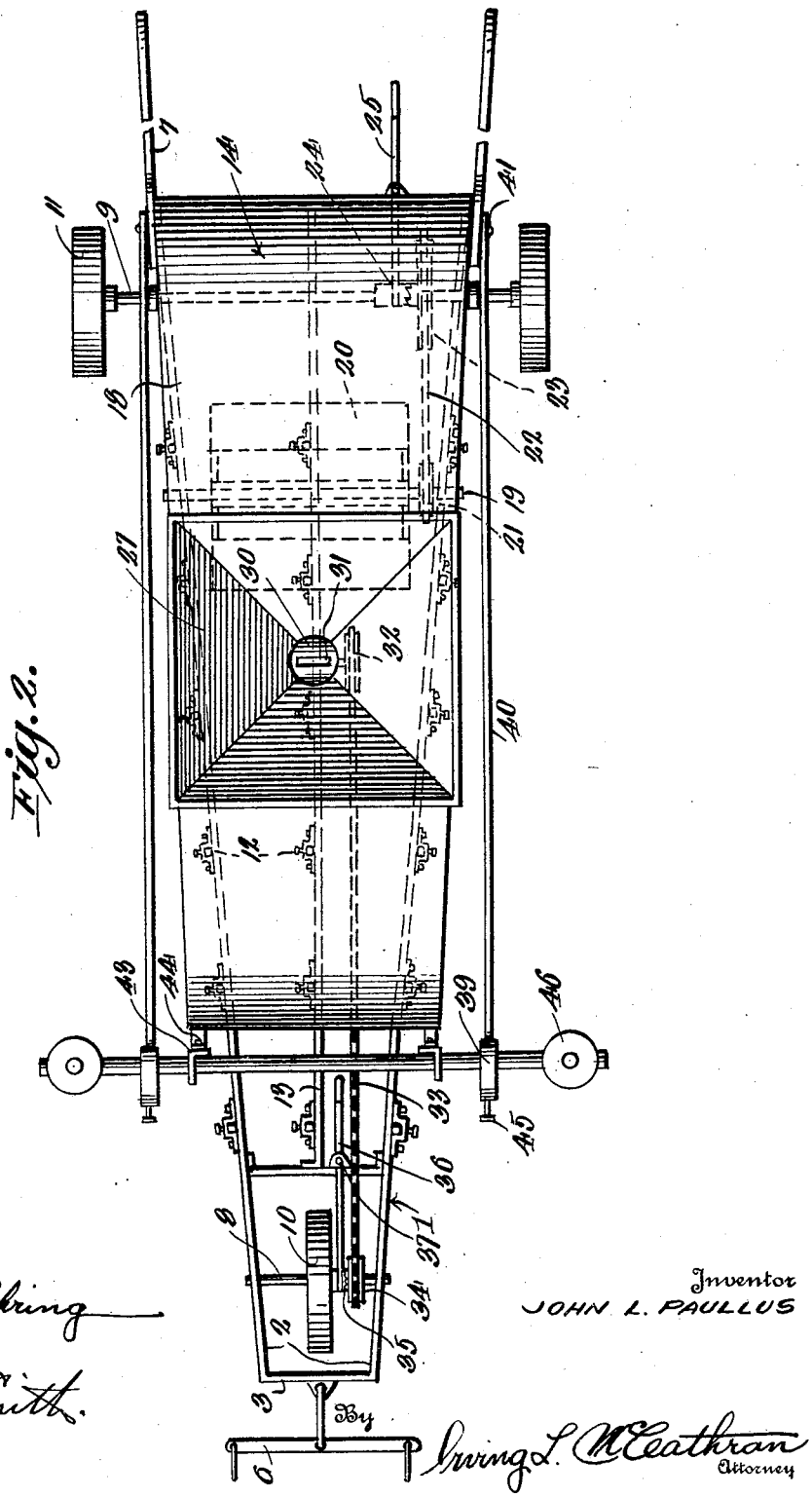

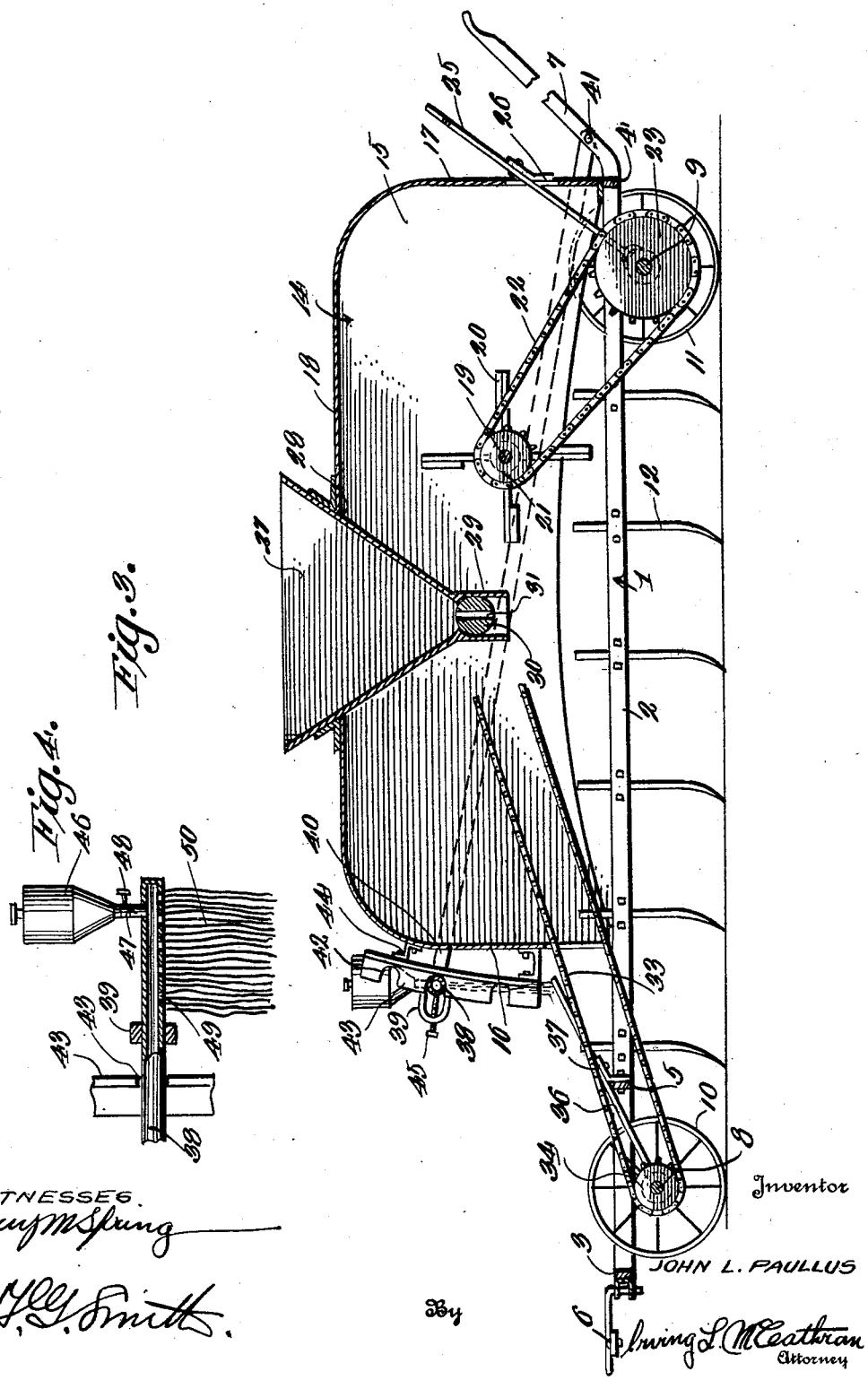

1,791,746

UNITED STATES PATENT OFFICE

JOHN L. PAULLUS, OF WABASH, INDIANA

PLANT-TREATING MACHINE

Application filed March 13, 1928. Serial No. 261,325.

This invention relates to machines for destroying insects on plants and is designed primarily for employment in the destruction of corn borers on growing corn. It is a well known fact that this insect, in its borer stage, is very destructive to growing corn and particularly during the months of July and August, the insect, during this season, and while in the borer or worm stage, causing great damage to the growing corn by boring into the stalks and into the partly developed ears of corn.

I have found that dust from the soil and dust from various finely powdered substances such for example as lime, if present upon the growing plants, in considerable quantity, will discourage the corn borer from boring into the stalks and ears of the plants and therefore the present invention has as a further object to provide a machine so constructed that, as it is drawn along the rows of growing corn, it will operate to automatically create a cloud of dust in such manner as to insure of its being deposited onto the corn to destroy the corn borers which are at such time active, as well as other corn borers which subsequenly reach the borer or worm stage.

Another object of the invention is to provide a machine of the general class referred to embodying mechanisms which may be selectively employed in accordance with different weather conditions so as to provide means for use under any and all weather conditions, for effectually destroying the corn borer and prevent damage to the growing corn, thus avoiding the enormous losses which are ordinarily sustained and at the same time placing the soil in better condition for winter wheat.

I have also found that various oils are highly effective in destroying corn borers or arresting the destruction which they cause and particularly where the oil is so applied to the growing corn that it will effect the accumulation of dust and the retention of the dust upon the stalks, leaves and ears of corn, and therefore the present invention contemplates the provision, in a machine of this class, of novel means whereby, if desired, oil may be applied in a light film to parts of the plant.

While the accompanying drawings and the description which is to follow, constitute a disclosure of the preferred embodiment of the invention, it will be understood that various changes may be made within the scope of what is claimed.

In the accompanying drawings:

Figure 1 is a view in side elevation of the machine embodying the invention;

Figure 2 is a top plan view thereof;

Figure 3 is a vertical longitudinal sectional view through the machine;

Figure 4 is a detail view partly in section and partly in elevation illustrating a portion of the machine.

The machine embodying the invention comprises a base frame which is indicated in general by the numeral 1 and which comprises side members 2, a front frame bar 3, a rear frame bar 4, and an intermediate cross bar 5 which is located in rear of the front frame bar 3, any suitable draft appliance, indicated by the numeral 6, being connected with the front frame bar 3 and it being understood that the machine may be drawn by a horse or horses or by a tractor, depending upon the size of the machine. A pair of handle bars 7 is preferably arranged at the rear end of the frame and constitutes means whereby the machine may be guided in its travel between the rows of corn. Front and rear axles indicated respectively by the numerals 8 and 9 are mounted at the front and rear ends of the frame 1, respectively, both axles being rotatable, and a single ground wheel 10 being fixed upon the axle 8 and ground wheels 11 being fixed upon the ends of the axle 9.

The greatest damage is done by the corn borer during the months of July and August when the borer is in the bore or worm stage, and at this time the soil is usually dry. As previously stated I have discovered that fine dust from the soil will act effectually to destroy the borers or at least discourage them from boring into the corn stalks and ears, and in order that dust may be raised from the soil and directed onto the growing plants, harrow teeth 12 are provided and a series of these teeth is mounted upon each of the side bars 2 of the frame 1, and preferably the frame structure further includes an intermediate longitudinal bar 13 which extends longitudinally medially between the bars 2 and upon which a series of the harrow teeth are likewise arranged. The harrow teeth, as will be observed by reference to the drawings, are so positioned that as the machine is drawn over the soil and between two adjacent rows of corn, the soil will be broken up and dust will be raised therefrom. It will also be observed by reference to Figure 2 that the side bars 2 of the frame are arranged in rearwardly diverging relation, so that a thorough disintegration of the soil by the harrow teeth is insured.

At this point it will be evident that, as the machine is drawn between the rows of corn, the harrow teeth 12 will disturb the soil in a manner to raise a dust, and in order that the dust may be directed onto the growing corn, a hood, indicated in general by the numeral 14 and preferably of light sheet metal, is arranged upon the frame 1 and this hood comprises side walls 15, a front end wall 16, a rear end wall 17, and a top 18, the hood being open at its bottom. Preferably the hood is of gradually increasing width from its forward end to its rear end, the front and rear corners of the hood being supported upon the side bars 2 of the frame of the machine and secured thereto in any suitable manner. A shaft 19 is rotatably journaled in suitable bearings upon the side walls 15 of the hood and this shaft carries fan blades 20 which radiate therefrom, and a sprocket gear 21 is fixed upon the shaft near one end thereof and a sprocket chain 22 is trained about this gear and about a sprocket gear 23 fixed upon the rear axle 9 near one end thereof, the gears and sprocket chain being located within the bounds of the hood 14. It will now be evident that as the machine travels over the soil and between the rows of corn, rotary motion will be imparted at a high rate of speed to the fan 20 with the result that the dust which is raised from the soil by the harrow teeth 12, will be blown, by the currents of air which are created within the hood 14 and which flow laterally beneath the lower edges of the side walls 15 of the hood, onto the growing corn, the said lower edges of the side walls of the hood being preferably curved upwardly between their ends as clearly shown in Figures 1 and 3 of the drawings. In order that the gear 23 may be thrown into and out of gear with the axle 9, a clutch 24 is provided and is adapted to be actuated by a hand lever 25 mounted through a slot 26 formed in the rear wall 17 of the hood.

Under conditions where the soil is not sufficiently light nor sufficiently dry to permit of a suitable quantity of dust being raised therefrom through the medium of the harrow teeth 12, the invention contemplates supplying a powdered insecticide or other substance, such as lime, to the corn in the form of dust, and in order that this may be accomplished a hopper 27 is mounted in an opening 28 in the top 18 of the hood 14 and is provided at its lower end and within the said hood with a depending delivery spout 29. The numeral 30 indicates a cylindrical valve or cut-off which is rotatably mounted within the spout 29 and which is provided with a diametric slot or passageway 31, the said valve member 30 having trunnions at its ends rotatably mounted in the opposite side walls of the spout 29, and a sprocket gear 32 being fixed upon one of these trunnions. A sprocket chain 33 is trained about the sprocket gear 32 and about a similar gear 34 loose upon the axle 8 for the front wheel 10, and a clutch 35 is provided for connecting the sprocket 34 with the axle 8, for rotation therewith, and is adapted to be actuated by a hand lever 36 mounted as at 37 upon the cross bar 5. At this point it will be evident that the valve member 30 is continuously rotated, when the clutch 35 is engaged so as to connect the sprocket gear 34 with the shaft 8, and therefore the lime or the like contained within the hopper 27 will be delivered in regulated quantities at frequent intervals, through the spout 29 and inasmuch as this spout is directly in advance of the fan blades 20, as shown in Figures 1, 2 and 3 of the drawings, the powdered material delivered from the spout will be blown by the fan blades in a forward direction and, as the air currents created within the hood 14 flow from the hood at the sides thereof, the powdered material or dust will be delivered onto the growing corn in the rows between which the machine is propelled.

As previously stated, the invention contemplates the provision of means whereby oil may be applied to the stalks, leaves, and ears of the corn growing in adjacent rows, and this means will now be described. The means referred to comprises a pipe 38 which is supported in yokes 39 formed at the forward ends of bars 40 which are pivotally mounted at their rear ends as at 41 upon the lower ends of the handle bars 7, the said bars 40 extending longitudinally at opposite sides of the hood 14 and the yokes 39 being located in advance of the front wall 16 of the said hood. The pipe 38 is designed to be seated interchangeably in corresponding ones of series of notches 42 which are formed in arcuate supporting bars 43 mounted upon brackets 44 upon the front wall 16 of the hood at opposite sides thereof, screws 45 being threaded through the outer ends of the yokes 39 and being adjustable to bind against the respective ends of the pipe 38 and thus hold the pipe in position in any two of the notches 42 in the two bars 43. In this manner the pipe 38 may be supported at various elevations in front of the hood 14 of the machine. Mounted upon the pipe at each end thereof, the pipe being closed at its ends, is an oil reservoir 46 which may be of any desired capacity and which is provided with a delivery spout 47 fitted into the upper side of the pipe 38 at the respective end thereof, a valve 48 being arranged in the spout 47 of each reservoir and manually adjustable to control the flow of oil through the spout and into the pipe 38, it being understood that the said valves 48 may be adjusted so as to provide for the desired regulated supply of oil to the pipe 38 or may be adjusted so as to entirely cut off the flow of oil through the pipe, when, for example, it is not desired to employ this part of the machine. The pipe 38 is formed in its under side, at each end, with a longitudinal series of delivery openings 49 through which the oil is to be delivered, and, in order that the oil may be supplied to the stalks, leaves, and ears of the growing corn, strands of cloth or the like, indicated by the numeral 50, are suspended from the ends of the pipe 38 and the oil, which is delivered through the openings 49, saturates these strands and flows down the same. At this point it will be understood that when this portion of the apparatus is to be employed, the valves 48 are opened to a suitable distance, and, as the machine is drawn along the rows of corn, the strands 50 will sweep over the corn thus applying a thin film of oil thereto.

From the foregoing description of the invention it will be evident that the air currents created within the hood 14, through the rotation of the fan 20, will result in the dust which is raised by the passage of the harrow teeth 12, through the soil, being blown onto the growing corn to produce the result stated and, if the soil is not in such condition that dust can be readily created in this manner, the hopper 27 may be filled with lime or other powdered material, suitable for the purpose, and the clutch lever 36 actuated so as to cause rotary motion to be imparted to the valve member 30 whereupon the powdered material, delivered from the hopper through the spout 29, will be blown by the fan onto the growing plants. Where it is desired to merely apply a film of oil to the growing plants, this may be accomplished by adjusting the clutch levers 25 and 36 so as to throw out of gear the fan 20 and the valve 30, the valves 48 in the spouts of the oil reservoirs 46 being adjusted to a more or less open position to regulate the supply of oil to the strands 50. If desired, the valves 48 may be adjusted as stated so as to provide for the application of a thin film of oil to the growing plants, and at the same time, either the harrow teeth 12, or the valve 30 may be brought into use as well as the fan 20 for effecting the direction of dust onto the plants subsequent to the application of the film of oil thereto, thus insuring of a firm adherence of the dust particles.

Having thus described the invention, what I claim is:

1. In a machine of the class described, a wheeled frame, a hood mounted above said frame and longitudinally thereof and open at its bottom, means operating within the hood for creating a blast of air therein to be delivered at opposite sides of its bottom, and means for delivering dust into said hood in the path of the escaping blast.

2. In a machine of the class described, a wheeled frame, a hood mounted above said frame and open at its bottom, means operating within the hood for creating a blast of air therein to be delivered at opposite sides of the bottom of the hood, and soil agitating means supported by the frame below the open bottom of the hood for creating dust from the soil in the path of the escaping blast.

3. In a machine of the class described, a wheeled frame, a hood mounted above said frame and extending longitudinally thereof and open at its bottom, means operating within the hood for creating a blast of air therein to be delivered at opposite sides of the bottom of the hood, means in said hood for delivering a dust in the path of the escaping blast, means at opposite sides of the hood and exteriorly thereof for sweeping contact with rows of plants to be treated to supply a film of oil thereto, and means for supplying oil to the last mentioned means.

4. In a machine of the class described, a wheeled frame, a hood mounted above said frame and open at its bottom, means operating within the hood for creating a blast of air therein to be delivered at opposite sides of the bottom of the hood, soil agitating means supported by the frame below the open bottom of the hood for creating dust from the soil in the path of the escaping blast, means in the path of the blast for sweeping contact with rows of plants between which the machine is moved, and means for supplying oil to the last mentioned means.

5. In a machine for destroying insects on growing corn plants, a wheeled frame, means upon the frame for agitating the soil to create a dust, means upon the frame for directing a blast to direct the dust against the foliage of the growing corn, and means in the path of the blast for sweeping contact with the foliage of the growing corn to apply oil thereto to accumulate the delivered dust.

In testimony whereof I affix my signature.

JOHN L. PAULLUS.